(No Model.)

B. MARSHALL.
NUT LOCK.

No. 401,044. Patented Apr. 9, 1889.

Witnesses,
Geo. H. Strong
J. H. Nourse

Inventor
Benj' Marshall
By Dewey & Co.
Att'ys

UNITED STATES PATENT OFFICE.

BENJAMIN MARSHALL, OF SAN FRANCISCO, CALIFORNIA.

NUT-LOCK.

SPECIFICATION forming part of Letters Patent No. 401,044, dated April 9, 1889.

Application filed November 30, 1888. Serial No. 292,326. (No model.)

*To all whom it may concern:*

Be it known that I, BENJAMIN MARSHALL, of the city and county of San Francisco, and State of California, have invented an Improvement in Nut-Locks; and I hereby declare the following to be a full, clear, and exact description thereof.

My invention relates to that class of nut-locks in which the bolt is so constructed as to serve to hold the nut upon it without the assistance of washers or other independent devices.

My invention consists in a bolt having a spring or resilient tongue, its junction with the bolt being toward the end or point of said bolt, while its free end is toward the head of the bolt.

My invention further consists, in combination with a bolt of this character, of a nut having an interior diameter slightly less than the diameter of the bolt, all of which I shall hereinafter fully describe.

Figure 1:
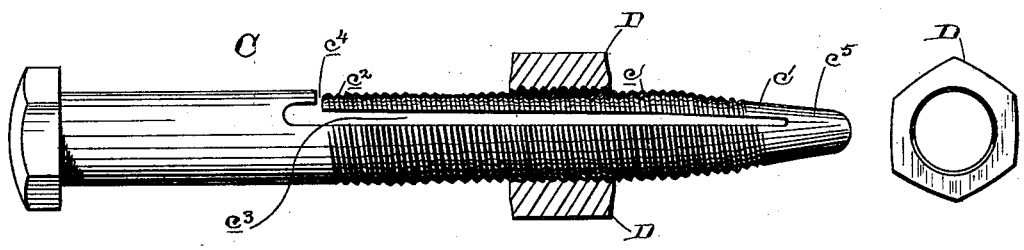
Figure 2:
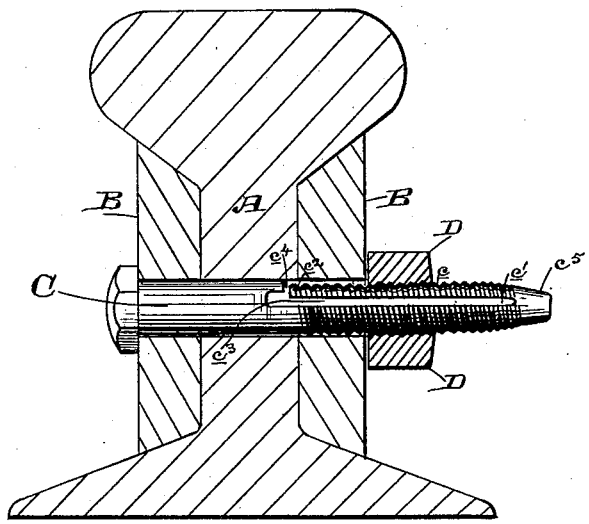

Referring to the accompanying drawings, Figure 1 is an elevation of the bolt, the nut being shown thereon in section, and also at the end in front elevation. Fig. 2 shows the application of my nut-lock.

Although my invention is applicable to locking the nuts of any machinery or mechanism, I have preferred to illustrate it in connection with railway-rails A and the connecting fish-plates B thereof.

C is the bolt. It has a spring or resilient tongue, $c$. Its junction with the bolt is toward its end, as shown at $c'$, and its free end $c^2$ is toward the head of the bolt. This tongue may be connected to or formed with the bolt in any suitable manner; but I prefer to slit or slot the bolt, as shown at $c^3$, and sever the wall at the end nearer the head, as at $c^4$, thus forming of said wall the spring-tongue $c$.

D is the nut.

The principle of my invention is this: The resistant strength of the tongue $c$ increases from its free end to its joined end. It is strongest at the point $c'$ and weakest at the point $c^2$; or, in other words, it is strongest at the end or point of the bolt and weakest near the head of the bolt. The constant jarring to which the nut is subjected causes its movement, and the direction of this movement will naturally be on the lines of least resistance. Therefore on my bolt the nut will move toward the head of the bolt instead of toward its end—that is to say, it will move closer to its work instead of moving from it, because it finds less resistance toward the free end of the spring-tongue $c$.

My bolt is the opposite of what is now known as the "split" bolt. This latter bolt has its end split and the nut fitted thereon. When it begins to move at all, it tends rather toward the end of the bolt than toward its head, as it finds the least resistance in the former direction. Now, in order to insure the perfect result at which I aim, I make my nut D with an interior diameter slightly less than the diameter of the bolt, so that the nut shall feel the spring-tongue, so to speak, and bear it down positively. Then, in order to pass the nut over the end of the bolt when first applied, I make the bolt end tapering, as shown at $c^5$, so that the nut does not feel the threads until it passes the junction of the spring-tongue $c$, which, yielding hard at first, grows easier as the nut is set up and travels along it. The interior of the nut may be made slightly tapering to engage the threads properly as it forces down the spring-tongue $c$ to an incline.

Having thus described my invention, what I claim as new, and desire to secure by Letters Patent, is—

1. A bolt for locking a nut thereon, having a spring or resilient tongue, the free end of which is toward the head of the bolt, and its place of junction with said bolt is toward the end of the bolt, substantially as described.

2. In a nut-lock, the combination of a bolt having a correspondingly-threaded spring or resilient tongue joined to or formed with it near its end, the free end of said tongue being toward the head of the bolt, and a nut seated upon said bolt and spring, substantially as described.

3. In a nut-lock, the combination of a bolt having a spring or resilient tongue joined to or formed with it near its end, the free end of said tongue being toward the head of the bolt, said bolt having a tapered end, and a nut seated on the bolt and tongue, and having an interior diameter less than the diameter of said bolt with its tongue, substantially as described.

In witness whereof I have hereunto set my hand.

BENJAMIN MARSHALL.

Witnesses:
   CHAS. E. KELLY,
   H. C. LEE.